March 21, 1961   J. PICANOL   2,975,508
TOOL FOR CUTTING BEVEL GEARS, HYPOID GEARS AND SIMILAR GEARS
Filed Aug. 11, 1958   2 Sheets-Sheet 1
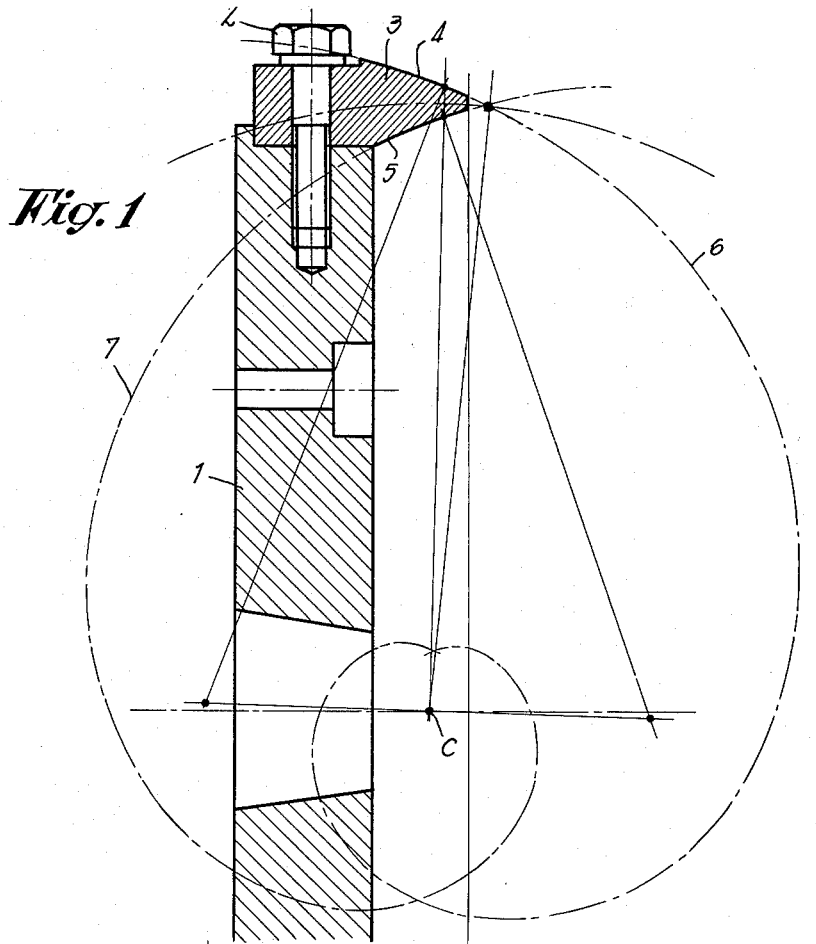
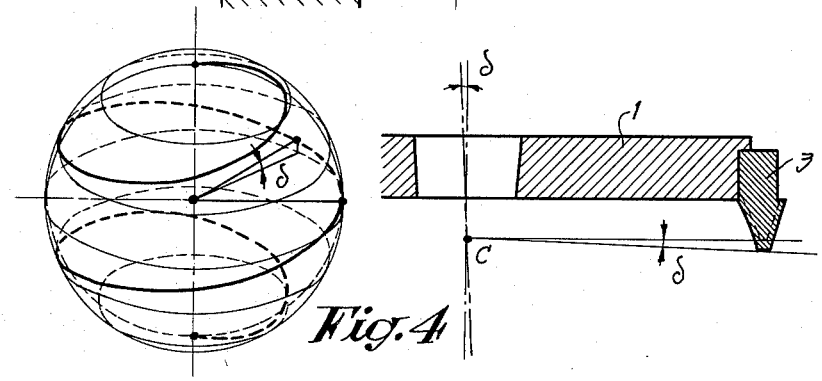
Jaime Picanol, INVENTOR
PER Richards & Geier
ATTORNEYS March 21, 1961 J. PICANOL 2,975,508
TOOL FOR CUTTING BEVEL GEARS, HYPOID GEARS AND SIMILAR GEARS
Filed Aug. 11, 1958 2 Sheets-Sheet 2

Jaime Picanol, INVENTOR
PER Richards & Geier
ATTORNEYS 2,975,508

TOOL FOR CUTTING BEVEL GEARS, HYPOID GEARS AND SIMILAR GEARS

Jaime Picanol, Casa Pairal Catalunya, Zillebeke-lez-Ypres, Belgium

Filed Aug. 11, 1958, Ser. No. 754,278

Claims priority, application Belgium Mar. 8, 1958

3 Claims. (Cl. 29—105)

This invention concerns circular cutters used for cutting bevel-gears with intersecting or nonintersecting axes, its main object being a new cutting profile for aforesaid cutters.

The profiles which are used at present for these cutters are either straight or shaped as circular arcs.

It is a well known fact that the inherent disadvantage of cutters with a straight profile the surfaces of revolution of which are rustums of cones, is to impart to the teeth whose height gradually diminishes from the outside towards the inside an offset which is slanting and extends too far in the direction of the height of the teeth. The correction of this offset involves long, hard and intricate calculations which are beyond the qualifications of most operators.

It is also well known that cutters whose profiles are circular arcs and whose surfaces of revolution are spherical or toric surfaces, although free of these drawbacks, have other major disadvantages. So for instance, on the one hand, the angle of pressure varies with the part of the profile involved, and on the other hand, the correct location of the center of the circular arcs of these profiles must be known to enable the adjustments of the machine to be calculated. These facts alone are sufficient to make the calculation still more intricate to such an extent that it can only be mastered by very few highly qualified specialists.

The purpose of the present invention is to create a tool which is free of those two main drawbacks. Its main object is to simplify the adjustment calculation so as to make it available to all operatives. A further object of the invention is to construct the tool in such way that the elements of adjustment can be tabulated, thus making the adjustment procedure of the machine infinitely simpler and faster.

According to the present invention and in order to fulfil these aims, the tool which in all other respects has the same characteristics as the traditional tools, is made with outlines shaped as logarithmic spirals. Both outlines are parts of similar logarithmic spirals with a common pole, one being a right-hand spiral and the other a left-hand one. Tools of this design can be made by any of the methods in current use for making tools with straight profiles or profiles shaped as circular arcs. This means that the tools according to the present invention could be fitted with detachable cutting blades, either with outer profile only or with inner profile only, or even with alternate outside and inside profiles.

It is thus merely by way of example that a particular design is described in further detail below, with reference to the appended figures of which:

Figure 1 is a partial radial section of a tool to which the characteristics, subject of the present invention, apply.

Figures 3 and 4 are schematic representations of the means for relieving or undercutting.

Figure 2:
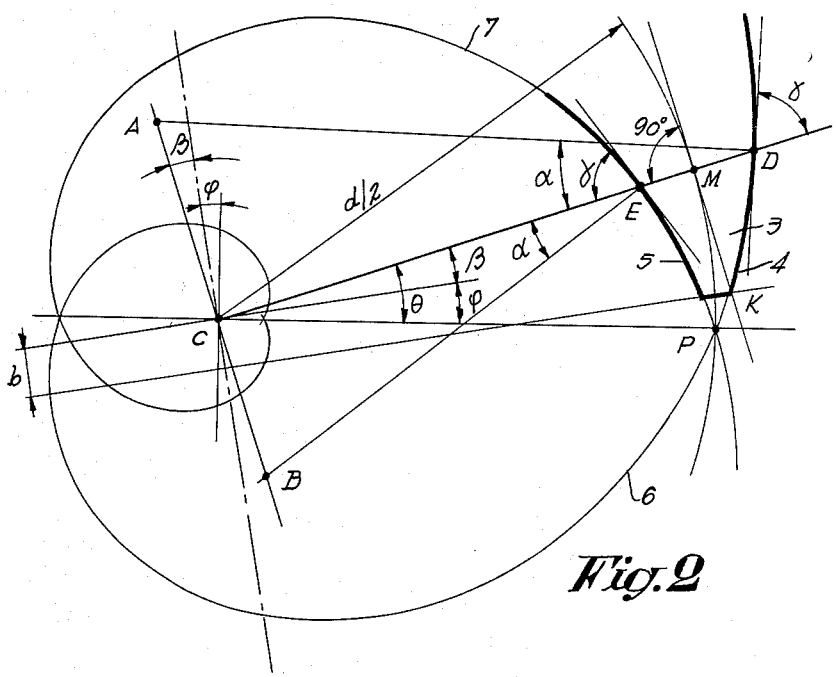
Figure 2 is a diagrammatic representation of the fundamental characteristics of the tools, subject of this invention.

In the design as represented in Figure 1, the tool is made-up, as usual, of a body or circular disc 1 on whose periphery cutters or cutting blades 3 are fastened, in the present instance, by screws 2.

According to the invention, these cutting blades have an outer contour 4 and an inner contour 5, both being parts of logarithmic spirals. They are in fact parts of logarithmic spirals 6—7 respectively, of which one is a left-hand, and the other a right-hand spiral, both having a common pole C.

Due to these new characteristics of the cutting tool, both aforementioned major disadvantages of the tools in common use to-day are done away with, as is clearly evidenced in the diagrammatic representation of Figure 2 and by the following considerations: applying the polar equation of the outer spiral 6 we have:

$$\overline{CD} \text{ or } R = \frac{d \cdot e^{\tan^2 \theta}}{2}$$

Similarly by applying the polar equation of the inner spiral 7 we have:

$$\overline{CE} \text{ or } r = \frac{d \cdot e^{-\tan^2 \theta}}{2} = \frac{d}{2 e^{\tan^2 \theta}}$$

In these equations, R is the radius vector of spiral 6 of the outer contour 4; r is the radius vector of spiral 7 of the inner contour 5; d is the nominal diameter (of which CP is the radius) of cutter 3; α is the pressure angle and δ is the vector angle.

On the other hand, if we consider the straight line $\overline{AD}$ which is a normal in D to the outer spiral 6, and the straight line $\overline{BE}$ which is a normal at E to the inner spiral 7, by applying the formula for the radius of curvature:

$$r\sqrt{1+m^2}$$

we obtain, as equations of aforesaid straight lines AD and BE:

$$\overline{AD} = R\sqrt{1+\tan^2 \alpha} = \frac{R}{\cos \alpha}$$

$$\overline{BE} = r\sqrt{1+\tan^2 \alpha} = \frac{r}{\cos \alpha}$$

This shows that the angles ACD and BCE are right angles and, consequently, that the straight line $\overline{ACB}$ is perpendicular to $\overline{CED}$.

Lastly, with respect to the outer spiral 6, we also have:

$$\overline{AC} = R \cdot \tan \alpha$$

and with respect to the inner spiral 7:

$$\overline{CB} = r \cdot \tan \alpha$$

As a result of the foregoing, we see that the angles of pressure $\overline{ADC}$ and $\overline{BEC}$ are equal (α) and constant for all values the vector θ. The consequence of this arrangement is that the machine must always be adjusted in such way that the common pole C is located in the cutting pitch. The projections of the centers of curvature A and B then lie on a perpendicular to this plane, intersecting the latter in C. Their location is easy and absolutely correct. It can in fact be obtained by two rotations which can easily be determined: one of these rotations takes into account the inclination of the tool in a direction perpendicular to the plane of the figure, depends on the required angle of the bottom of the tooth and correspond to a rotation about the straight line $\overline{CD}$; the second rotation takes into account the inclination of the tool in the plane of the figure, depends on the depth and, hence, on the required module, and corresponds to a rotation about the pole C.

The axis of the tool goes through the common pole C and may be inclined at any angle ($\varphi$) with respect to the origin CP of the spirals. However, since a given tool is intended for cutting a limited number of modules, the angle $\varphi$ should be chosen in such way that it be acceptable for the smallest as well as for the largest of the modules involved. Consequently, if we call $\beta$ the inclination of the tool with respect to the pitch plane in the plane of the figure, we have $\theta = \varphi + \beta$. In this case, it is easy to adjust matters in such way that for cutting the smallest module, the inclination of the tool with respect to the pitch plane be zero ($\beta = 0$).

With this arrangement, the centers of curvature A and B will lie on the axis of the tool when cutting the smallest module, but will recede from this axis, always on the same side, as the module to be cut becomes larger.

Another possibility would be to arrange things in such way that the inclination of the tool with respect to the pitch plane be zero when cutting the mean module with respect to the smallest and largest modules provided for. In this case, $\beta$ would be negative for small modules and positive for the larger ones. The centers A and B would then move from one side of the axis to the other and would coincide with the latter when cutting the mean module. It thus appears clearly that there may be many possible combinations for obtaining an easy and fast way of adjusting the machine.

The smallest module which can be cut with such tool depends on the width of the tool point, which itself depends on the distance between the pole C and the extreme plane of rotation of the tool, distance marked $b$ on the drawing.

From the foregoing it can thus be found that the tool and its correct position will depend on the following factors:

(1) Smallest and largest modules which can be cut;
(2) Nominal diameter $d$ of the cutter;
(3) Angle of pressure $\alpha$;
(4) Distance $b$ between the pole C and the extreme plane of rotation of the tool;
(5) The angular displacement $\varphi$ between the plane of rotation of the tool and the point from which originate the parts of the spirals delimiting the inner and outer outlines of the tool;
(6) The distance from the pole C to point D of the outer outline, i.e. the distance $$R = \frac{d \cdot e^{\tan \alpha (\varphi + \beta)}}{2}$$

(7) Distance of the pole C from point E of the inner outline, i.e. the distance $$r = \frac{d^2}{4R}$$

The values of R and r, which are variable, can be tabulated either with $\theta$ or indirectly with $\beta$ as argument. In the latter case, it is not necessary to know the value of $\varphi$ for subsequent calculations. The thickness of the tool $$DE = R - r$$

as well as the amount by which it projects $$MK = \frac{b}{\cos \beta} + \frac{d \cdot \tan \beta}{2}$$

can also be tabulated. It will likewise be possible to tabulate the radii of curvature $\overline{AD}$ and $\overline{BE}$ as well as the values of the sub-normals corresponding to AC and CB, thus systematically doing away with all calculations concerning the tool.

It will be noticed that the difference between the radii of curvature $$\frac{(R-r)}{\cos \alpha}$$

on which depends the mismatch in the direction of the height of the teeth increases with the module, which is quite normal. As a matter of fact, large gears, having to transmit larger torques, are made as small as possible and are therefore subject to larger distortions than small gears whose minimum dimensions are more generally determined by constructional considerations than by the power which they have to transmit.

It will also be noticed that, due to the new characteristics which have been given to the tool according to the invention, the constancy of the angle of pressure $\alpha$ makes it possible to set-out in a table a series of values which depend directly on this angle, which was not the case with tools shaped as a circular arc. The net result is, that calculation can thus be dispensed with.

The actual construction of the tool can anyway be effected as described and stated before. Furthermore, the grinding of the outlines is no more difficult than the grinding of tools shaped as a circular arc.

A further characteristic of the tool, which is the subject of the invention, is that the undercut can be performed by any of the known methods, the only condition being that the outline remains constant. Apart from this, the tool according to the invention also lends itself to an undercut under new and original conditions which consist in undercutting in the direction of a helix inscribed in a sphere whose center is the common pole of the logarithmic spirals. This new undercutting system, which might be called "polar undercut," has the advantage that the pole always remains at the same distance from the face by which the tool is fastened.

Figure 3:
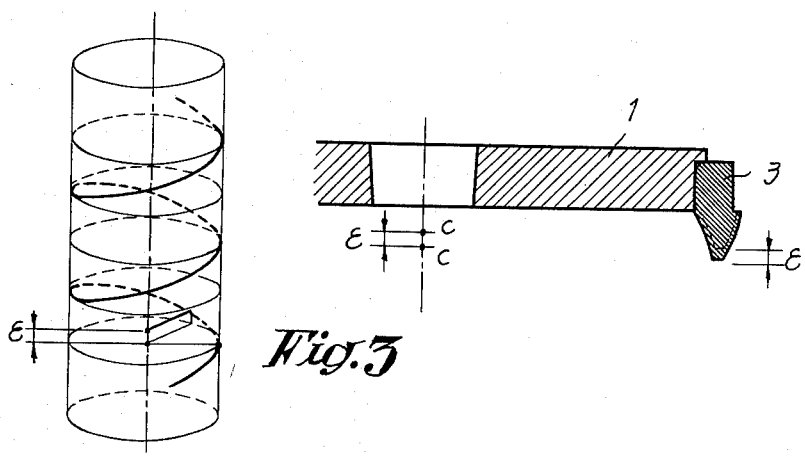

The advantage resulting from this new arrangement will be more clearly understood by comparing the diagrams of Figures 3 and 4. We see in fact, that with axial undercut, i.e. along a cylindrical helix, as shown in Figure 3, after each grinding operation the pole C has moved along the axis XX by an amount $e$ which must then be measured in order to make it possible, by some appropriate and special means, to relocate aforesaid pole C correctly on the machine.

The contrary happens with polar undercut i.e. in the direction of a spherical helix as shown schematically in Figure 4, where it can be seen that the pole C is not subject to any displacement; we must however measure the angle $\delta$ by known means, i.e, by existant means, after which it will be enough to incline the axis of the tool by this supplementary amount $\delta$ for cutting to the same depth.

It thus appears that the new characteristics have not only the advantage of involving no further complications in the shape of the tools, but that most of the elements on which the adjustment of the tool and of the machine depend can be tabulated beforehand. Such adjustments can be made in a systematic way and without implying and difficulty nor special brain effort for gear cutting operatives of any ability. Moreover, the few remaining calculations are extremely simple, fast and within the ability of practically any skilled operator who specializes in the cutting of bevel, hypoid and similar gears.

What I claim is:

1. A tool for cutting bevel, hypoid and similar gears, characterized by the fact that the outlines of the cutting teeth of the tool are shaped as logarithmic spirals.

2. A tool according to claim 1, said tool having cutting teeth with inner and outer outlines, characterized by the fact that said outer outline and said inner outline of the cutting teeth are both parts of similar logarithmic spirals having a common pole, whereby one of these spirals is a right-hand one and the other a left-hand one.

3. A tool according to claim 1, said tool consisting of a cutter having cutting teeth with inner and outer outlines, characterized by the fact that said outer outline is a part of a logarithmic spiral, the pole of said spiral being located on the axis of the cutter, and that said inner outline is a part of a similar logarithmic spiral whose pole is the same as that of the first mentioned spiral.

References Cited in the file of this patent

UNITED STATES PATENTS

| | | |
|---|---|---|
| Re. 16,172 | Trbojevich | Sept. 22, 1925 |
| 1,313,034 | Williams | Aug. 12, 1919 |
| 1,654,199 | Wildhaber | Dec. 27, 1927 |
| 1,656,506 | Williams | Jan. 17, 1928 |
| 1,689,566 | Trbojevich | Oct. 30, 1928 |
| 2,114,793 | Bauersfeld | Apr. 19, 1938 |
| 2,285,133 | Wildhaber | June 2, 1942 |
| 2,342,232 | Wildhaber | Feb. 22, 1944 |
| 2,648,894 | Wildhaber | Aug. 18, 1953 |

FOREIGN PATENTS

| | | |
|---|---|---|
| 230,873 | Great Britain | Mar. 20, 1925 |